United States Patent [19]

Okabayashi et al.

[11] Patent Number: 4,971,425
[45] Date of Patent: Nov. 20, 1990

[54] DISPLAY DEVICE

[75] Inventors: Shigeru Okabayashi; Junichi Fukano, both of Yokohama; Masao Sakata, Tokyo, all of Japan

[73] Assignee: Nissan Motor Co., Ltd., Yokohama, Japan

[21] Appl. No.: 225,817

[22] Filed: Jul. 29, 1988

[30] Foreign Application Priority Data

Aug. 10, 1987 [JP]  Japan .................................. 62-198207

[51] Int. Cl.$^5$ ............................................. G02F 1/133
[52] U.S. Cl. ...................................... 350/345; 350/334
[58] Field of Search ..................... 350/338, 334, 345; D12/192

[56] References Cited

U.S. PATENT DOCUMENTS

| | | | |
|---|---|---|---|
| 3,932,024 | 1/1976 | Yaguchi et al. | 350/338 |
| 4,196,973 | 4/1980 | Hochstrate | 350/338 |
| 4,386,826 | 6/1983 | Stolov | 350/338 |
| 4,545,648 | 10/1985 | Shulman et al. | 350/338 |
| 4,874,228 | 10/1989 | Aho et al. | 350/345 |

FOREIGN PATENT DOCUMENTS

| | | | |
|---|---|---|---|
| 3618516 | 6/1987 | Fed. Rep. of Germany | 350/345 |
| 2373075 | 8/1978 | France | 350/345 |
| 60-152544 | 10/1985 | Japan . | |

Primary Examiner—Stanley D. Miller
Assistant Examiner—Anita Pellman Gross
Attorney, Agent, or Firm—Foley & Lardner, Schwartz, Jeffery, Schwaab, Mack, Blumenthal & Evans

[57] ABSTRACT

Herein disclosed is a display device for use in an instrument panel of a motor vehicle. The display device comprises a display source for producing light by which visual informations are formed; a plane mirror arranged to reflect the light toward a given position; and a liquid crystal panel arranged in the given position to selectively pass the reflected light therethrough.

13 Claims, 3 Drawing Sheets

DISPLAY DEVICE

BACKGROUND OF THE INVENTION

1. Field of the Invention

The present invention relates in general to display devices for use in an instrument panel of a motor vehicle or the like, and more particularly to display devices of a type which uses a mirror for reflecting the visual informations from a display source toward a viewer.

2. Description of the Prior Art

Japanese Utility Model First Provisional Publication No. 60-152544 shows a display device used in an automotive instrument panel. The display device of the publication is schematically illustrated in FIG. 6 of the accompanying drawings, which generally comprises a display source 2 (such as a fluorescent character display tube, a liquid crystal display panel or the like) mounted within a meter housing 1, and a plane mirror 3 located below the display source 2 having a predetermined angle defined therebetween.

As is illustrated by the broken lines in the drawings, the visual information-carrying light produced by the display source 2 is directed to the mirror 3 and reflected by the same toward a viewer 5 (that is, a driver). In fact, the viewer sees a virtual image 4 formed behind the mirror 3.

However, due to its inherency in construction, the display device of this type has the following drawback.

That is, when the viewer moves his (or her) head to an upper position where his eyes face perpendicularly the mirror 3, he is obliged to see his face or eyes in the mirror 3. This phenomenon however lowers the visibility of the visual informations from the display source 2. One method to eliminate this undesired phenomenon is to provide suitable shading walls 6a and 6b to a front side of the meter housing 1. However, in this case, the display area within which the visual informations from the display source 2 are displayed is considerably reduced causing a poor usage of the mirror 3.

SUMMARY OF THE INVENTION

It is therefore an object of the present invention to provide a display device which is free of the above-mentioned drawbacks.

According to the present invention there is provided a display device which, for improving the visibility of visual informations from a display source, uses a liquid crystal filter.

According to the present invention, there is provided a display device which comprises a display source for producing light by which visual informations are formed; a plane mirror arranged to reflect the light toward a given position; and a liquid crystal panel arranged in the given position to selectively pass the reflected light therethrough.

DETAILED DESCRIPTION OF THE INVENTION

Figure 1:
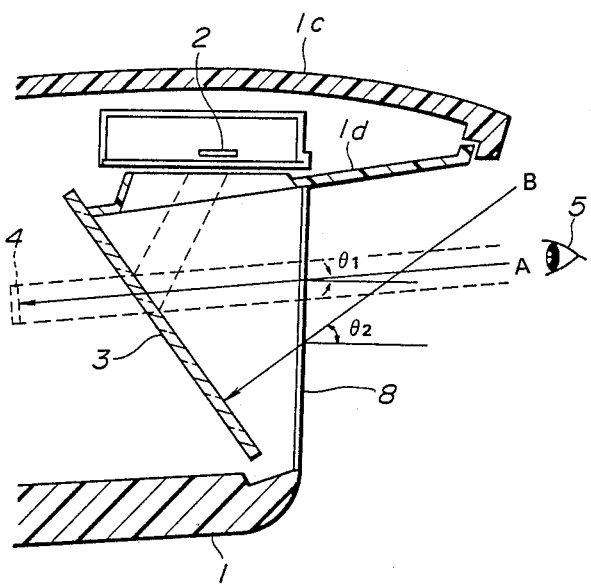
FIG. 1 is a vertically sectional view of a display device of the present invention, which is a first embodiment.

Referring to FIG. 1, there is shown a display device of a first embodiment of the present invention, which is arranged in an automotive instrument panel.

The display device comprises a display source 2 (such as a fluorescent character display tube or the like) which is mounted within a meter housing 1 at a position near an upper wall 1c of the meter housing 1. The display source 2 is supported on a supporting frame 1d having its display face directed downwardly. A plane mirror 3 is located below the display source 2 with a predetermined angle defined therebetween. As will be understood from the position where the driver's eyes 5 are illustrated, the plane mirror 3 is inclined to face toward a ceiling (not shown) of the vehicle cabin. An upper end of the mirror 3 is fixed to the supporting frame 1d. A liquid crystal panel 8 is arranged in front of the mirror 3 in a manner to conceal the same.

The liquid crystal panel 8 is of a full-face TN type which comprises two polarizing plates and a liquid crystal sealingly sandwiched between the polarizing plates. As shown, the liquid crystal panel 8 is arranged perpendicular relative to the upper wall 1c of the meter housing 1.

Figure 2:
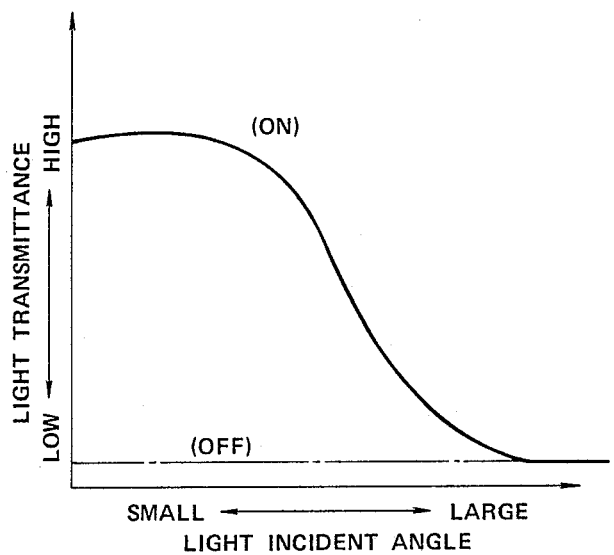
FIG. 2 is a graph showing the characteristic of a liquid crystal panel employed in the invention.

FIG. 2 is a graph showing the characteristic of the liquid crystal panel 8. As is understood from this graph, when applied with no voltage (viz., OFF), the panel 8 shuts a light transmission therethrough, while, when applied with a certain voltage (viz., ON), the panel 8 transmits light. The panel 8 exhibits a high light transmittance when the angle of incidence of light is small. More specifically, when the light incident angle exceeds a certain degree, the light transmittance suddenly lowers.

Although not shown in the drawings, a drive circuit of the liquid crystal panel 8 is connected to an ignition switch of an associated motor vehicle. Thus, only when the motor vehicle operates, the visual information from the display source 2 can be viewed through the liquid crystal panel 8. As is seen from FIG. 1, when a driver 5 assumes his normal driving position wherein his eyes 5 form the line of sight denoted by reference "A", the light incident angle "$\theta_1$" relative to the panel 8 provided by the driver's eyes is very small. Thus, under this condition, the driver 5 can clearly see the virtual image 4 behind the mirror 3 through the panel 8. While, when the driver 5 moves his head upward to a position where his eyes form the line of sight "B", the light incident angle "$\theta_2$" increases thereby lowering the light transmittance. In this condition, the undesired phenomenon wherein the driver's face or eyes are viewed in the mirror 3 is eliminated. That is, the panel 8 serves as a light filter.

Figure 3:
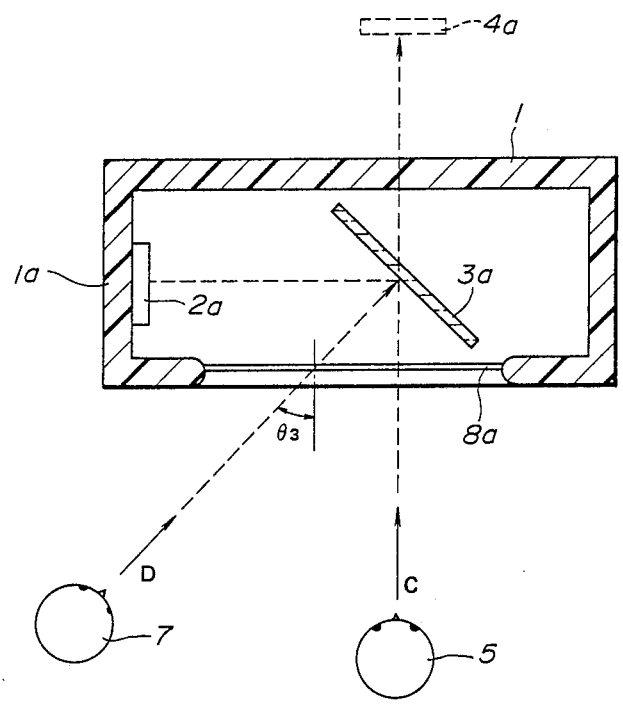
FIG. 3 is a horizontally sectional view of a display device of a second embodiment of the present invention.

Referring to FIG. 3, there is shown a second embodiment of the present invention.

The display device of this embodiment comprises a display source 2a which is mounted within a meter housing 1 at a position near one side wall 1a of the housing 1. A plane mirror 3a is disposed in the housing 1 having a predetermined angle defined relative to the display source 2a. That is, in this embodiment, the mirror 3a is inclined to face toward a side wall (not shown) of the vehicle cabin. A liquid crystal panel 8a is arranged in front of the mirror 3a in a manner to conceal the same.

When the driver 5 assumes his normal driving position wherein his eyes form the line of sight denoted by reference "C", the light incident angle provided by the driver relative to the panel 8a is very small (viz., substantially zero). Thus, the virtual image 4a behind the mirror 3a can be viewed well by the driver.

When a passenger 7 seated near the driver' seat looks into the meter, his or her eyes form such a line of sight as denoted by reference "D" and thus the light incident angle "$\theta_3$" is relatively large. Under this condition, the undesired phenomenon wherein the face or eyes of the person are viewed in the mirror 3a is eliminated.

Figure 4:
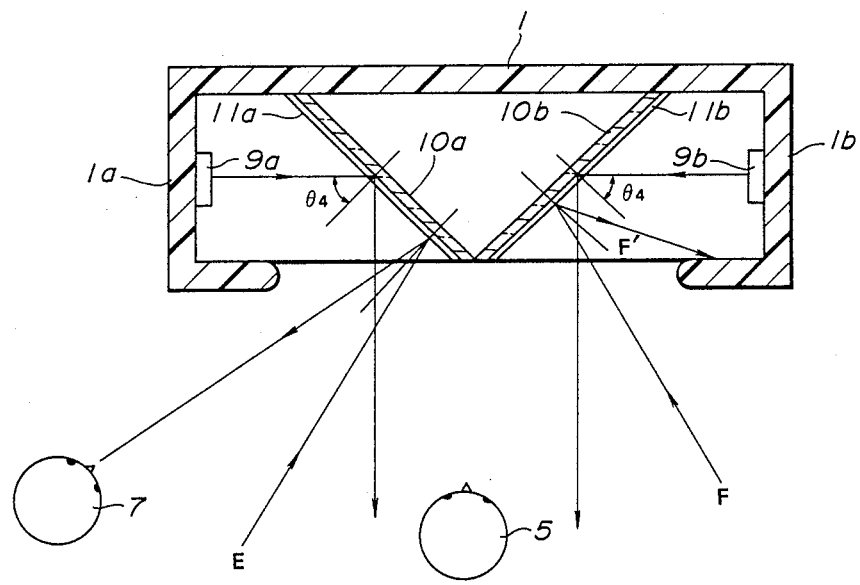
FIG. 4 is a view similar to FIG. 3, but showing a third embodiment of the present invention.

Referring to FIG. 4, there is shown a third embodiment of the present invention.

The display device of this embodiment comprises a pair of units each including a display source 9a or 9b mounted on one side wall 1a or 1b of the meter housing 1, a plane mirror 10a or 10b inclined with respect to the associated display source 9a or 9b, and a liquid crystal panel 11a or 11b lined on the mirror 10a or 10b. In the illustrated embodiment, the two display sources 9a and 9b are arranged to face to each other, and the mirrors 10a and 10b are arranged to define therebetween an angle of about 90 degrees.

Figure 5:
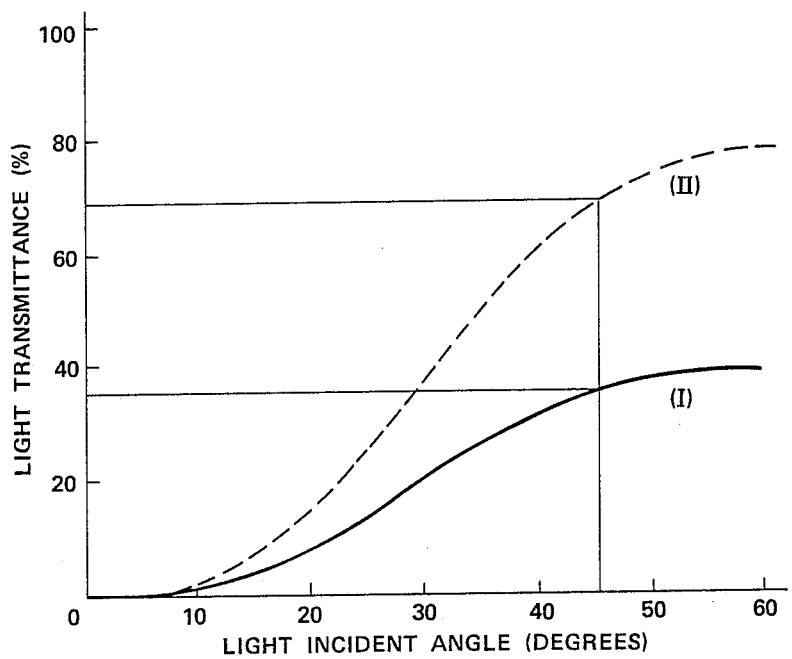
FIG. 5 is a graph showing the characteristic of a liquid crystal panel employed in the third embodiment.
Figure 6:
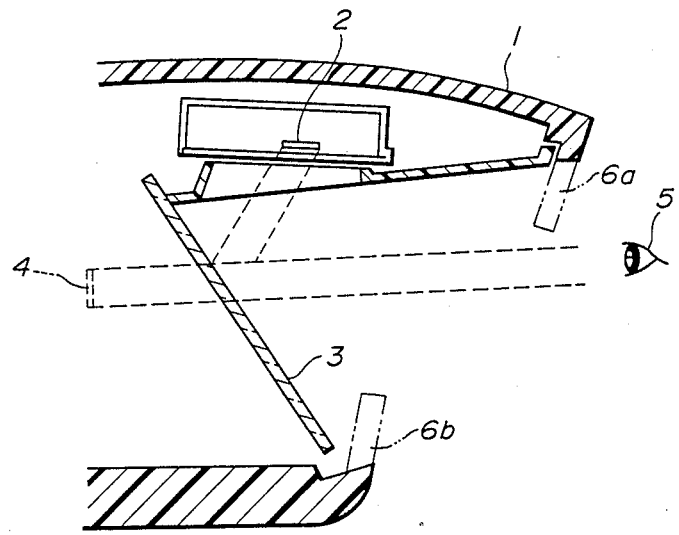
FIG. 6 is a vertically sectional view of a conventional display device used in an automotive instrument panel

FIG. 5 is a graph showing the characteristic of each liquid crystal panel 11a or 11b used in this embodiment. As is understood from this graph, the characteristic of the panel 11a or 11b is different from that of the above-mentioned embodiments. That is, the liquid crystal panels 11a and 11b used in the third embodiment exhibit a high light transmittance when the light incident angle is large. The curve denoted by reference "I" is a combined component curve consisting of a vertically polarizing component and a horizontally polarizing component, while the curve denoted by reference "II" shows the vertically polarizing component.

In operation, the visual information-carrying light from the display device 9a or 9b is directed to the liquid crystal panel 11a or 11b with an incident angle "$\theta_4$" of about 45 degrees. In this case, about 35% light transmittance is effected by the panel 11a or 11b as is understood from the curve "I" of FIG. 5. The light is then reflected by the plane mirror 10a or 10b and directed to the panel 11a or 11b with a light incident angle of about 45 degrees. Since the reflected light from the mirror 10a or 10b contains a vertically polarizing component, about 70% light transmittance is effected by the panel 11a or 11b as is understood from the curve "II" of FIG. 5. Thus, in total, about 25% ($=0.35\times0.70\times100$) of the visual information-carrying light produced by the display source 9a or 9b is transmitted to the eyes of the driver 5 through the panel 11a or 11b. This percentage is enough for giving a clear visual informations of the display source 9a or 9b to a viewer.

When a passenger 7 seated adjacent the driver's seat looks into the meter, his or her eyes form the line of sight denoted by reference "E" and thus the light incident angle thus provided is very small. Thus, the undesired phenomenon wherein the face or eyes of the person are viewed in the mirror 10a does not occur. Furthermore, if an external light beam is directed to the liquid crystal panel 11b in a direction denoted by "F", the reflected light beam "F'" does not lower the visibility of the visual informations from the display source 9b so long as the light incident angle is small.

If desired, the liquid crystal panel 8, 8a, 11a or 11b may be coated at its outer face with an anti-reflection film. With this, the light transmittance of the panel is improved.

What is claimed is:

1. A display device comprising:
   a display source for producing light by which visual information is produced;
   a plane mirror arranged to reflect said light toward a given position; and
   a liquid crystal panel arranged in the path of the reflected light from said mirror toward said given position, said liquid crystal panel selectively passing the reflected light therethrough,
   wherein said liquid crystal panel is so arranged that at least light which travels in a direction approximately perpendicularly to said mirror is blocked by said liquid crystal panel.

2. A display device as claimed in claim 1, in which said plane mirror is inclined with respect to both said display source and said liquid crystal panel.

3. A display device as claimed in claim 2, in which said liquid crystal panel is of a full-face TN type.

4. A display device as claimed in claim 3, in which said liquid crystal panel is closed to light transmittance therethrough in the absence of an applied voltage.

5. A display device as claimed in claim 4, in which said liquid crystal panel exhibits high light transmittance when the angle of incidence of light thereon is small.

6. A display device as claimed in claim 4, in which said liquid crystal panel exhibits low light transmittance when the angle of incidence of light thereon is large.

7. A display device comprising:
   a display source for producing light by which visual information is formed;
   a plane mirror arranged to reflect said light toward a given position; and
   a full-face TN type liquid crystal panel arranged in said given position to selectively pass the reflected light therethrough in response to an applied voltage, the liquid crystal panel exhibiting low light transmission when the angle of incidence of the light is large;
   wherein the plane mirror is inclined with respect to both said display source and said liquid crystal panel.

8. A display device comprising:
   a pair of units which are arranged symmetrically, each unit including a display source for producing light by which visual information is formed; a plane mirror arranged to reflect said light toward a given position; and a liquid crystal panel arranged in said given position to selectively pass the reflected light therethrough.

9. A display device as claimed in claim 8, in which the respective display sources of the paired units are arranged to face each other and in which the respective plane mirrors are arranged to define therebetween an angle of approximately 90 degrees.

10. A display device as claimed in claim 8, in which the liquid crystal panels are lined on the associated plane mirrors.

11. An instrument panel for a motor vehicle, comprising:

a meter housing having side walls, an upper wall and an opened front side, said opened front side facing a passenger cabin of the motor vehicle;

a display source steadily installed within said meter housing, said display source producing light by which visual information is formed;

a plane mirror installed with said meter housing in a manner to reflect said light toward said opened front side; and a liquid crystal panel connected to said meter housing to cover the opening of said front side.

12. An instrument panel as claimed in claim 11, in which said display source is positioned in the vicinity of said upper wall.

13. An instrument panel as claimed in claim 11, in which said display source is positioned in the vicinity of one of said side walls of said meter housing.

* * * * *